(12) United States Patent
O'Halloran et al.

(10) Patent No.: US 11,093,160 B2
(45) Date of Patent: Aug. 17, 2021

(54) SNAPSHOT COMPLIANCE TECHNIQUES

(71) Applicant: EMC IP Holding Company LLC, Hopkinton, MA (US)

(72) Inventors: Brian O'Halloran, Carrigaline (IE); Siobhan McLoughlin, Crookstown (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 109 days.

(21) Appl. No.: 16/568,636

(22) Filed: Sep. 12, 2019

(65) Prior Publication Data

US 2021/0081112 A1    Mar. 18, 2021

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01); *G06F 3/0664* (2013.01)

(58) Field of Classification Search
CPC ........ G06F 3/065; G06F 3/067; G06F 3/0604; G06F 3/0664
See application file for complete search history.

(56) References Cited

U.S. PATENT DOCUMENTS

| | | | |
|---|---|---|---|
| 8,706,833 B1 * | 4/2014 | Bergant | G06F 16/1844 709/214 |
| 2013/0219156 A1 * | 8/2013 | Sears | H04L 41/0866 713/1 |
| 2017/0220777 A1 * | 8/2017 | Wang | G06F 21/105 |
| 2018/0316577 A1 * | 11/2018 | Freeman | H04L 41/5009 |

* cited by examiner

*Primary Examiner* — Hiep T Nguyen
(74) *Attorney, Agent, or Firm* — Muirhead and Saturnelli, LLC

(57) ABSTRACT

Techniques for determining snapshot compliance may include receiving policy information for a snapshot policy associated with a storage group of logical devices; receiving snapshot information regarding snapshots taken of the storage group during a time period denoting an amount of time corresponding to the retention time for the storage group; determining, based on the snapshot creation interval of the snapshot policy, a timeline of expected policy runtimes denoting different points in time at which the snapshot policy is scheduled to run to take a snapshot of the storage group; analyzing the snapshot information and the timeline to determine a number of valid snapshots of the storage group; and determining a compliance level for the time period based on the number of valid snapshots of the storage group and at least one compliance threshold.

20 Claims, 13 Drawing Sheets

SNAPSHOT COMPLIANCE TECHNIQUES

BACKGROUND

Technical Field

This application generally relates to data storage and, more particularly, techniques performed in connection with snapshots.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for determining snapshot compliance. Such techniques may include: receiving policy information for a snapshot policy associated with a storage group, wherein the storage group includes one or more logical devices, wherein the policy information includes a snapshot creation interval, a retention time denoting an amount of time to keep snapshots for the storage group, a maximum number of snapshots retained, and at least one compliance threshold; receiving snapshot information regarding snapshots taken of the storage group during a time period denoting an amount of time corresponding to the retention time for the storage group; determining, based on the snapshot creation interval, a timeline of a plurality of expected policy runtimes denoting different points in time at which the snapshot policy is scheduled to run to take a snapshot of the storage group; analyzing the snapshot information and the timeline to determine a number of valid snapshots of the storage group; and determining a compliance level for the time period based on the number of valid snapshots of the storage group and the at least one compliance threshold. The at least one compliance threshold may include a plurality of compliance thresholds. The plurality of compliance thresholds may denote a plurality of ranges of values, and each of the plurality of ranges may denote a different one of a plurality of compliance levels. Determining the compliance level may include: determining a percentage of the number of valid snapshots of the storage group with respect to the maximum number of snapshots retained; determining that a first of the plurality of ranges includes the percentage, wherein the first range denotes a first of the plurality of compliance levels; and determining the compliance level as the first compliance level denoted by the first range.

In at least one embodiment, the snapshot policy may be executed at the plurality of expected policy runtimes to take a snapshot of the storage group. Executing at each of the plurality of expected policy runtimes may include taking a snapshot of each logical device of the storage group. The number of valid snapshots of the storage group may denote a number of the plurality of expected policy runtimes at which a valid snapshot of the storage group is taken.

In at least one embodiment, processing may include determining, for each of the plurality of expected policy runtimes, whether each logical device of the storage group has a good snapshot with an associated timestamp corresponding to said each expected policy runtime; and responsive to determining, for said each expected policy runtime, that each logical device of the storage group has a good snapshot with an associated timestamp corresponding to said each expected policy runtime, determining that said each expected policy runtime has a valid snapshot of the storage group, and otherwise, determining that said each expected policy runtime does not have a valid snapshot of the storage group. A first of the plurality of expected policy runtimes may be associated with a time window of allowable time variation and wherein the first expected policy runtime may be determined to have a valid snapshot of the storage group. Each logical device of the storage group may have a good snapshot taken with an associated timestamp included in a first time range. The first time range may span from a starting value of the first expected policy runtime to an ending value denoted by the sum of the first expected policy runtime and an amount of time denoted by the time window. The time window may be determined as a minimum of two value. The two values may include a maximum amount of time, and a second amount of time that is a percentage of the snapshot creation interval.

In at least one embodiment, the storage group may be one of a plurality of storage groups and the snapshot policy may be one of a plurality of snapshot policies. Each of the plurality of snapshot policies may be scheduled to run for at least one of the plurality of storage groups at a first point in time denoted by the first expected policy runtime. A number of snapshots of logical devices scheduled to run at the first point in time may exceed a threshold number and processing may include determining the time window in accordance with the number of snapshots of logical devices scheduled to run at the first point in time. Each of the plurality of snapshot policies may be scheduled to run for at least one of the plurality of storage groups within a first time period beginning with the first expected policy runtime. A number of snapshots of logical devices scheduled to run during the first time period may exceed a threshold number and processing may include determining the time window in accordance with the number of snapshots of logical devices scheduled to run at during the first time period.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
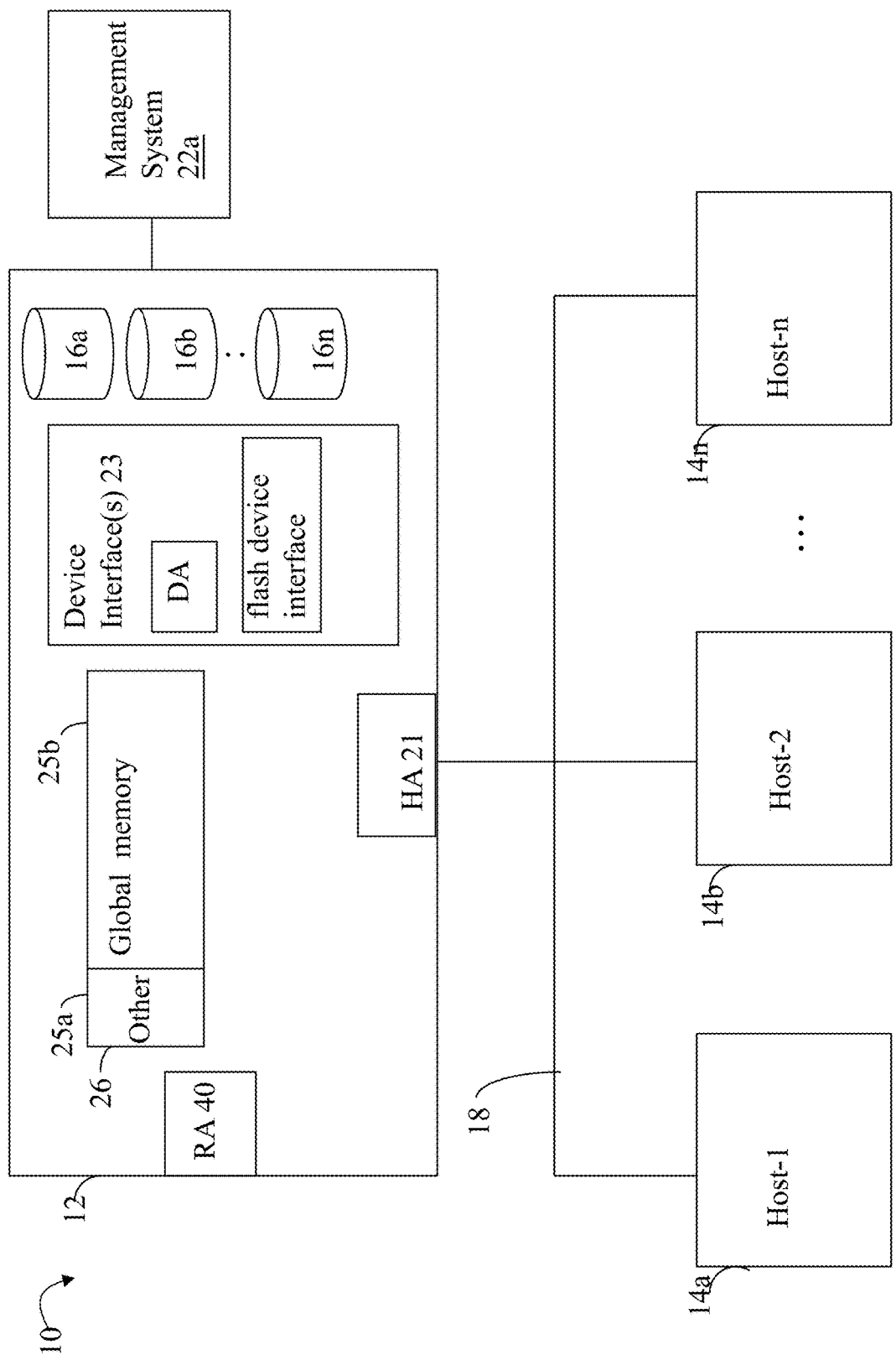
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors.

The data storage system 12 may be a data storage array including a plurality of data storage devices 16a-16n. The data storage devices 16a-16n are non-volatile physical storage devices (PDs) providing backend data storage for storing data provisioned for use in connection with logical devices, described elsewhere herein. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs), which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like.

Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding PD and location on the PD. The DA which services the particular PD may further perform processing to either read data from, or write data to, the corresponding physical device location for the I/O operation.

Also shown in FIG. 1 is a management system 22a that may be used to manage and monitor the system 12. In one embodiment, the management system 22a may be used in connection with management of the data storage system 12. In at least one embodiment, the management system 22a may be a computer system executing a management application.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing described herein in following paragraphs as well other suitable processing.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 2:
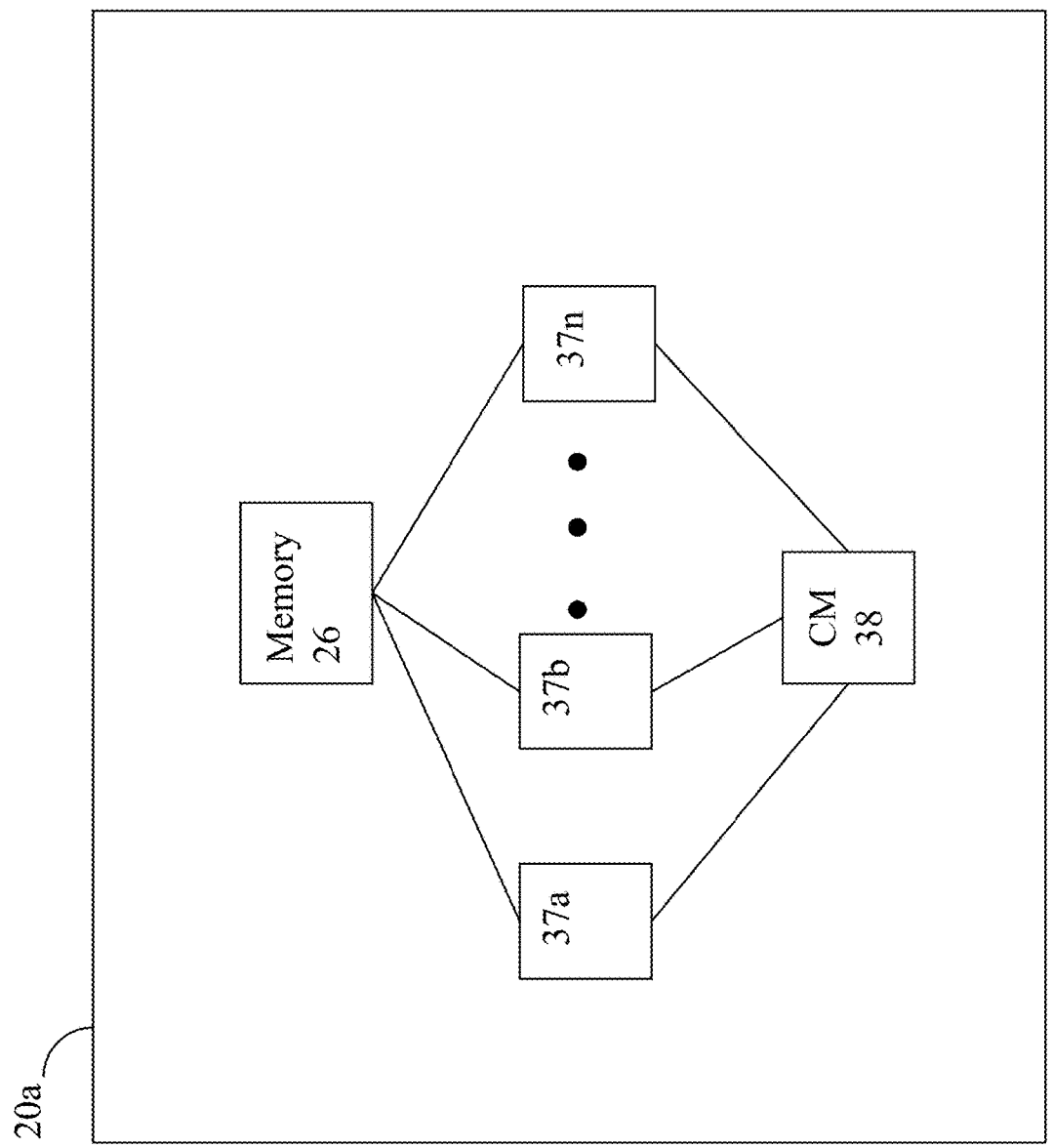
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory or SSD technologies. In at least one embodiment of the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed.

In connection with performing I/O operations, such as writes as well as reads, a data storage system in an embodiment in accordance with the techniques herein may use a cache in order to improve performance.

In at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

In at least one embodiment in accordance with techniques herein, the snapshot facility may be TimeFinder® SnapVX™ by Dell Inc. using the COFW or ROW techniques as noted above. With ROW, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location. For example, U.S. patent application Ser. No. 15/969,048, filed May 2, 2018, "Efficient Snapshot Activation", Chandrashekhara et al, which is incorporated by reference herein in its entirety, describes in more detail processing that may be performed in at least one embodiment in connection with establishing or creating a targetless snapshot as well as a linked snapshot (e.g., linked to a logical device identifier), processing performed in connection with servicing I/O operations directed to the snapshot and source logical device, and other processing.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system, such as another computer system or other device with a processor that is connected to the data storage system 12. Such commands may be, for example, to establish or modify data services; view performance or health of various system components and storage entities; provision storage; perform user account management; and the like. For example, commands may be issued over the control path to provision storage for LUNs; define a storage group (SG) which is a logically defined group of one or more LUNs; create a snapshot; define conditions of when to create another snapshot; define or establish local and/or remote replication services; define or modify a schedule for snapshot or other data replication services; define a RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Taking snapshots of data used by an application is one way in which the data used by the application may be protected. Data used by the application may be stored on one or more logical devices forming a logical group, also referred to herein as an SG as noted above. Sometimes, data protection may be desired or required, such as by various rules, regulations or laws. Consistent with discussion herein, taking a snapshot of a LUN, or more generally a source storage entity, produces a point in time copy of the source storage entity. At a later point in time, the snapshot may be retrieved for use or inspection. Thus, the snapshot of a LUN, for example, denotes a working logical copy of the LUN's data at a point in time.

Some rules, regulations, and/or laws require taking snapshots at defined time intervals as well as a requirement to retain the snapshot for a defined period of time. As such, described below are techniques that may be performed to determine or verify whether requirements such as the foregoing regarding snapshots are being followed. A snapshot policy (sometimes also referred to herein simply as policy) may be defined which specifies policy information, such as, for example, the frequency or time interval at which snapshots are taken, the number of snapshots to retain, and a retention time period denoting an amount of time that a snapshot is retained. A snapshot policy may be associated or paired with an SG including one or more LUNs. Taking a snapshot of the SG may include taking a snapshot of each LUN of the SG. The time (e.g., date and time of day) at which each snapshot of a LUN is taken may be denoted by a timestamp of the LUN's snapshot. Processing may be performed to determine, for the SG, a compliance status or level with respect to the SG's associated snapshot policy.

The policy may also identify multiple thresholds that denote multiple compliance levels or statuses. As such, processing may be performed to determine one of the multiple compliance levels or statuses for the SG at particular points in time in order to verify that particular regulatory or other requirements as specified in the snapshot policy are being met. The snapshot policy may be automatically run or executed at each occurrence of the specified time interval to take a new snapshot of the associated SG. Subsequently, processing as described herein may be performed to determine a compliance level of the snapshots of the SG with respect to the associated snapshot policy. Snapshot compliance may be determined by analyzing the SG snapshots obtained within a period of time and correlating the timestamps of the snapshots of the LUNs of the SG with expected policy execution or runtimes (e.g., expected times at which the policy is scheduled to run based on the time interval or frequency of the policy). Multiple policies may also be associated with, and in effect for, the same SG. In at least one embodiment, the compliance level or status may be represented by a percentage value mapped to a visual indicator, such as a color denoting one of multiple possible compliance levels. In an SG with multiple associated snapshot policies, an aggregate or collective compliance level may be determined as the lowest or minimum compliance level of all such policies for the SG.

The foregoing as well as other aspects of the techniques herein are described in more detail in following paragraphs.

Figure 3:
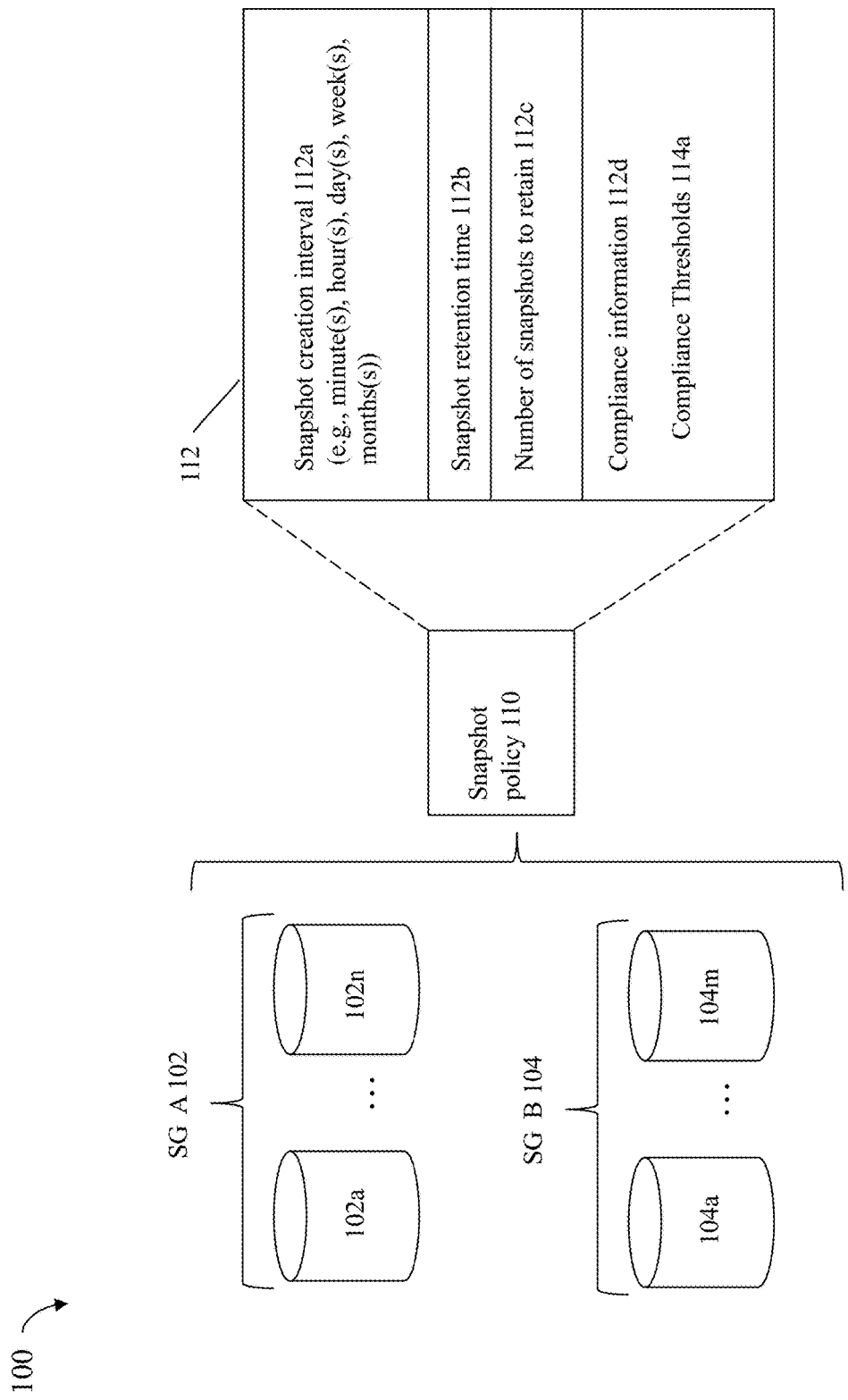
FIG. 3 is an example illustrating storage groups associated with a snapshot policy in an embodiment in accordance with the techniques herein.

Referring to FIG. 3, shown is an example 100 of SGs and an associated snapshot policy in an embodiment in accordance with the techniques herein. In the example 100, SGs 102 and 104 are both associated with the same snapshot policy 110. However more generally, as few as one SG may be associated with the snapshot policy 110. Also, more than one snapshot policy may be associated with a single SG, such as SG 102 or 104. Each SG may include one or more LUNs. In the example 100, SG 102 includes "n" LUNs and SG 104 includes "m" LUNs.

Element 112 illustrates in more detail information that may be included in snapshot policy 110. The snapshot policy 110 may include a snapshot creation interval 112a, a snapshot retention time 112b, the number of snapshots to retrain 112c and compliance information 112d. The interval 112a may denote the frequency or periodic time interval at which a snapshot of an associated SG is taken. For example, the interval 112a may indicate to take a snapshot of an associated SG every minute, every hour, every day, every week, or some number of one of the foregoing units of time (e.g., every 5 minutes, every 3 days). The snapshot retention time 112b may denote the amount of time a snapshot of an SG is retained. The number of snapshots to retain 112c denotes the maximum number of snapshots retained for the SG. Generally, the snapshot retention time 112b may be determined as the snapshot creation interval 112a multiplied by the number of snapshots to retain 112c. In at least one embodiment, the snapshot retention time 112b of a policy may not be stored as an actual value. Rather, in such an embodiment, the snapshot retention time 112b may be calculated as noted above when needed as the snapshot creation interval 112a multiplied by the number of snapshots to retain 112c. The compliance information 112d may include one or more compliance thresholds 114a.

The one or more compliance thresholds 114a may be used to determine numeric ranges of compliance values used to determine a compliance level or status associated with each compliance level or status. For example, in at least one embodiment as described in more detail below, 2 compliance thresholds may be specified defining 3 contiguous, consecutive, sequential ranges of percentages. Collectively, the 3 ranges of percentages may include all percentages in the inclusive range 0-100%. Each range may be associated with a different compliance level or status, such as green, yellow or red. For example, in at least one embodiment, a first percentage may be specified denoting a boundary between the green and yellow compliance levels and a second percentage may be specified denoting a boundary between the yellow and red compliance levels. The compliance levels may be ranked, from highest level of compliance to lowest level of compliance, as green (highest compliance level), yellow, (middle compliance level) and red (lowest or worst compliance level). It may be required or desirable to have the SG with an associated snapshot policy have an associated green level of compliance.

The particular compliance level for an SG may be denoted by a visual indicator on the GUI. For example, with the foregoing compliance states or levels of green, yellow and red, the compliance state for an SG with respect to a particular policy may be visually displayed by the color of the compliance state or level.

In at least one embodiment, a compliance calculation may be performed periodically for an SG and a policy associated with the SG to determine a percentage value. The percentage value may be based on the number of valid SG snapshots within a time period that denotes an amount of time of the snapshot retention time. The percentage may be expressed as the number of valid SG snapshots with respect to the number of snapshots to retain 112c of the policy (e.g., the number of scheduled expected policy runtimes in the time period). As described in more detail below, a valid SG may be determined with respect to an expected policy execution time or runtime when each LUN of the SG has a good snapshot which a timestamp corresponding to the expected policy execution time or runtime. A good snapshot of a LUN may be a healthy, non-failed, non-missing snapshot of the LUN. Put another way, a good snapshot of a LUN may be a snapshot that is functional and usable and created without error. An invalid SG snapshot is determined with respect to an expected policy execution time when each LUN in the SG does not have a good LUN snapshot that has a timestamp corresponding to the expected policy execution time. Thus, a SG snapshot taken at a policy execution time or runtime may be invalid if any LUN snapshot is not good (e.g., missing or failed) or if a LUN's snapshot does not have a corresponding timestamp with respect to the expected policy execution time or runtime. The number of invalid SG snapshots for the time period (spanning an amount of time equal to the snapshot retention time) may be determined as the total number of expected policy runtimes or execution times minus the number of valid SG snapshots during the time period.

In at least one embodiment, due to the possible time variations in measurements of snapshot timestamps and scheduled execution of policies, correspondence between a LUN's snapshot and the scheduled policy runtime or execution may be determined using W, a configurable time window of allowable time variation. The timestamp of a snapshot of a LUN may be expected to fall within a range spanning an amount of time W from the scheduled policy runtime. Put another way, the range has a starting value, denoted by the scheduled policy runtime, and an ending value, denoted by the sum of the scheduled policy execution time and the amount of time W.

Figure 4A:
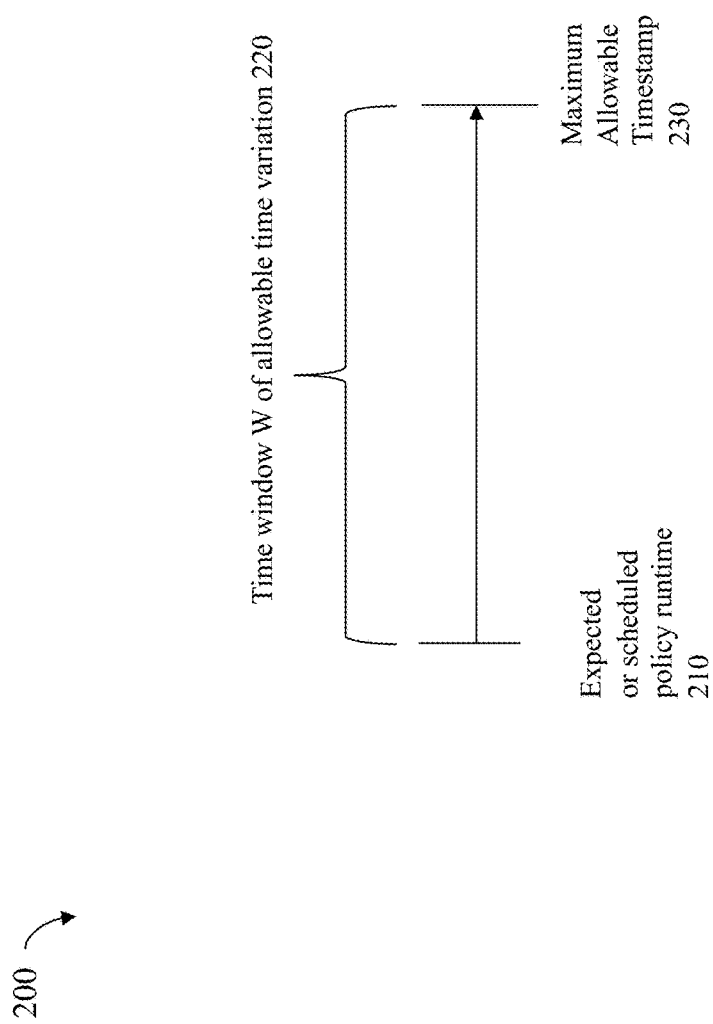
FIG. 4A is an example illustrating a time window W that may be used in an embodiment in accordance with the techniques herein.

Referring to FIG. 4A, shown is an example 200 illustrating the time window W of allowable time variation in an embodiment in accordance with the techniques herein. The example 200 includes element 210 denoting an expected or scheduled policy runtime and element 230 denoting a maximum allowable timestamp. Element 220 denotes the time window W. With respect to a scheduled policy execution time, a snapshot of a LUN of an SG taken at the policy execution time 210 is expected to have a timestamp that falls within the inclusive range of time having a lower bound denoted by 210 and an upper bound denoted by 230. Thus 230 denote the maximum allowable timestamp value for a LUN snapshot in order for the timestamp to be considered as corresponding or matching the expected or scheduled policy runtime 210.

The selection of W may account for the amount of time it may take to take a snapshot of each LUN in the SG associated with policy executed at 210. The policy may begin execution at time 210. However, a snapshot of each LUN in the SG may not occur at the same time 210. In at least one embodiment, processing may be performed to synchronize all the LUNs of the SG so that the data on all the LUNs of the SG is write consistent. For example, if the SG includes LUN A and LUN B, both LUNs may be locked at a same point in time so that both LUNs may include writes or modifications up to the same point in time. Once locks are taken on all LUNs of the SG so no modifications or writes are performed, a snapshot of each of the LUNs may be taken. Subsequently, the snapshots may be unlocked or released. The snapshots of the LUNs of the SG may be taken at multiple points in time and thus may have associated timestamps that vary and are greater than time 210. However, it may be expected that all such timestamps for all LUNs having snapshots corresponding to the policy runtime 210 be within the time window W 220 subsequent to the policy runtime 210. If a snapshot of a LUN occurs outside of the time window W 220, the snapshot's timestamp does not correspond to the expected or scheduled policy runtime 210.

Generally, the amount of time W 220 may be determined using any suitable technique. Following are some examples illustrating how an embodiment may determine the amount of time W 220.

In at least one embodiment, the amount of time W 220 may be determined based on the snapshot creation interval 112a from the policy executed at time 210. In at least one embodiment, W may be a percentage or fraction of the snapshot creation interval 112a. For example, W may be 10% of the snapshot creation interval 112a. In such an embodiment, W may also be no more than a specified maximum value.

In at least one embodiment, the amount of time W 220 may be determined as the minimum of 2 values where the first value is 10% of the snapshot creation interval 112a, and the second value is a specified maximum, such as 5 minutes. More formally, in such an embodiment, W 220 may be expressed as in EQUATION 1 below:

$$W = MIN((10\% * \text{snapinterval}), (\text{maxvalue}))$$   EQUATION 1

Where
 snapinterval denotes the snapshot creation interval 112a from the policy executed;
 maxvalue denotes the specified maximum value; and
 MIN takes the minimum of the 2 parameters, where the first parameter is (10%*snapinterval) and the second parameter is (maxvalue).

In at least one embodiment, the amount of time W 220 may be determined in accordance with the number of LUN snapshots scheduled for execution at the same point in time. In such an embodiment, W may vary with the number of LUN snapshots scheduled for execution at the same point in time. As described herein, there may be multiple policies for multiple SGs scheduled to execute at a same point in time. Additionally, depending on the embodiment, there may be large numbers of LUN, such as hundreds of LUNs or more, in a single SG. Thus, an embodiment may choose to scale W in accordance with the LUN snapshot workload or number of LUN snapshots scheduled for execution at the same point in time.

In at least one embodiment, a threshold maximum number of LUNs, THRESH, may be specified. An initial value for W may be specified and used for a scheduled policy runtime 210 when no more than THRESH LUN snapshots are scheduled for execution at the same point in time. If there are more than THRESH LUN snapshots scheduled for execution at the same time, W may be further increased. As noted, there may be multiple policies scheduled to run at the same point in time. For example, assume 2 policies, policy A and policy B, are scheduled for execution at the same first point in time. Also, assume THRESH is 5000. Policy A is scheduled to execute at the first point in time and result in taking snapshots of SG A including 6000 LUNs. Policy B is also scheduled to execute at the first point in time and result in taking snapshots of SG B including 5000 LUNs. Thus, 11,000 LUN snapshots across 2 policies are scheduled to be taken at the first point in time. W may be initially have a value determined based on EQUATION 1 above. W, as used with both policies A and B may be increased if the total number of LUNs scheduled for execution at the first point in time is more than THRESH, 5000. In this case, the total number of LUN snapshots scheduled at the same first point in time is 11,000 and is greater than THRESH. Thus, W may be increased or scaled based on the total number of LUN snapshots scheduled at the same first point in time. For example, processing may determine the difference between the total number of snapshots scheduled for execution at the same time and THRESH. In this example, the difference is 11,000−5,000=7,000. An embodiment may then increment W based on the additional 7000 LUN snapshots scheduled such as based on a ratio of 7000/THRESH=1.4 The embodiment may increase W, for use with execution of policies A and B at the first point in time, by an additional amount of 1.4*the initial value for W. For example, assume the initial value for W is 5 minutes based on EQUATION 1. W may be further increased by 420 seconds or 7 minutes (e.g., 1.4*5 minutes or 300 seconds)

In connection with the above example, it should be noted that if W is not greater than THRESH, the initial value for W as described above may be applied and used in connection with both policy A and policy B scheduled for execution at the same first point in time.

As a further variation, an embodiment may determine W with respect to policies and LUN snapshots scheduled for execution within a same time period K. For example, reference is made to FIG. 4B. The example 250 denotes a time period K 260 denoting an inclusive range having a starting or lower bound scheduled policy execution time E1 251 and ending with an upper bound of time J 262. For example, E1 may be a time on the hour, such as 1 p.m. Rather than just determine the total number of policies and thus total number of LUN snapshots scheduled for execution at the single point in time E1 251, an embodiment may also look ahead an additional amount of time denoted by K 260. In this case, the total number of policies considered are those scheduled for execution during the time period K 260, and therefore, the total number of LUN snapshots evaluated includes all LUN snapshots scheduled to be taken by such policies scheduled for execution during the time period K 260.

Figure 4B:
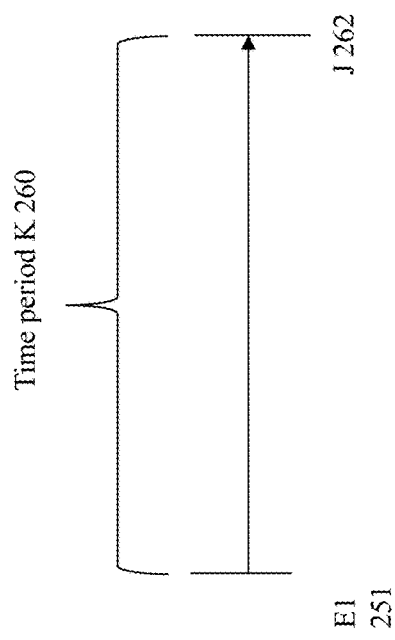
FIG. 4B denotes a time period K during which scheduled policy execution times may be considered when determining the size of the time window W in an embodiment in accordance with the techniques herein.
Figure 4C:
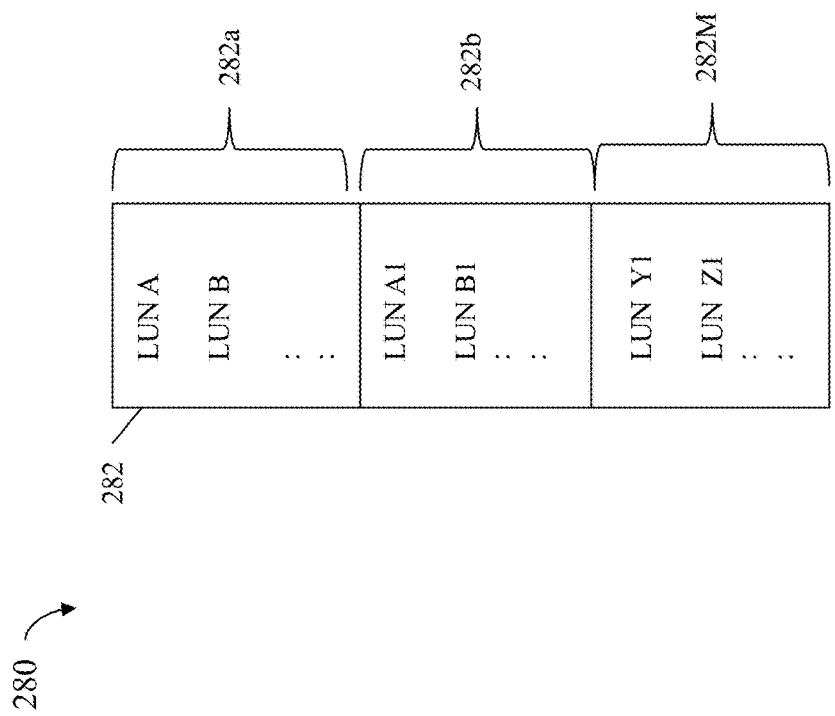
FIG. 4C illustrates a list of LUNs scheduled to have snapshots taken during the time period K in an embodiment in accordance with the techniques herein.

In connection with an embodiment using the technique as described in connection with FIG. 4B, an ordered list of expected LUN snapshots scheduled during time period K may be determined. For example, FIG. 4C illustrates an ordered list 282 of LUNs whose snapshots are scheduled to be taken during time period K 260. The list may denote a sequential order in which the LUN snapshots are scheduled. Processing may partition list 282 into segments 282a-282M. Each segment may include a number of LUNs, such as THRESH number of LUNs. Thus, each additional segment of LUN snaps in segments 282b-M scheduled may have additional time added to W. Thus, an embodiment may further increase or extend W based on the placement or position of a scheduled LUN snapshot in the list. For example, an embodiment may use the initial value for W as determined using EQUATION 1 for determining corresponding timestamps for snapshots of the LUNs in the segment 282a. For snapshots scheduled for LUNs in the segment 282b, W may be determined as the sum of the W used for segment 282a plus a first increment. For snapshots scheduled for LUNs in the segment 282c, W may be determined as the sum of the W used for segment 282b plus a second increment. In a similar manner, each W used for segment "j+1" may be determined as the sum of the W used for segment "j" plus an additional increment. In such an embodiment, the increment added for each subsequent segment may be the initial value for W as determined using EQUATION 1.

As noted above, any suitable technique may be used to determine a value for W for a scheduled snapshot policy execution time or runtime.

Figure 5:
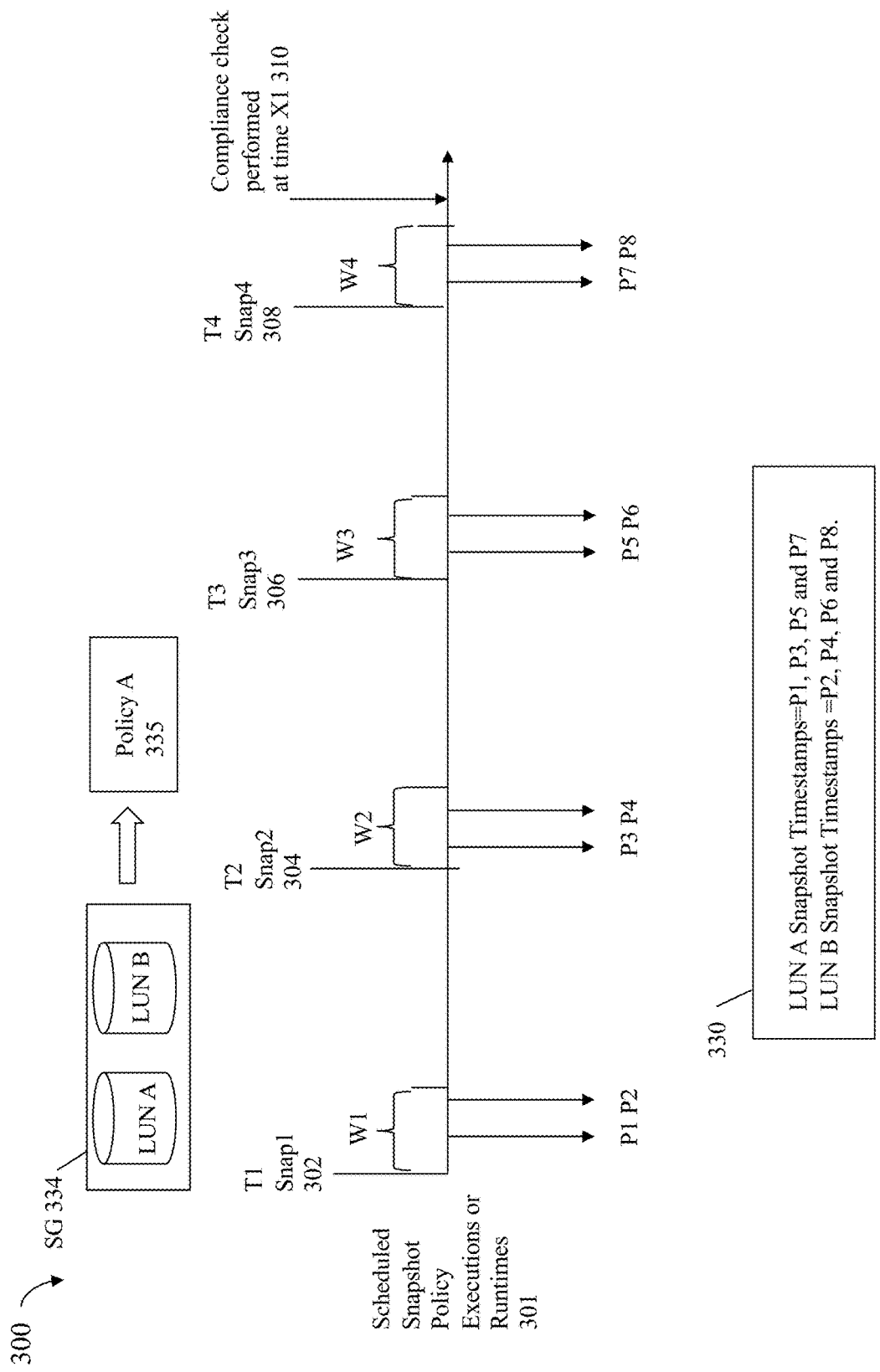
FIGS. 5 and 6 illustrate examples of compliance checks that may be performed in an embodiment in accordance with the techniques herein.

To further illustrate use of the techniques herein in determine a compliance level or status, reference is made to FIG. 5. The example 300 includes SG 334 that includes the LUNs A and B. Element 301 denotes a timeline of scheduled policy execution times or runtimes based on a single policy, policy A 335, associated with SG 334. T1 302, T2 304, T3 306 and T4 308 denote 4 sequential scheduled policy execution times determined based on information of policy A 335. The information of policy A 335 may generally include information as described in connection with the FIG. 3. Assume the policy A 35 indicates that a snapshot is to be taken every hour, there is a maximum of 4 retained SG snapshots and that the policy A has a snapshot retention time of 4 hours. W1, W2, W3 and W4 denote, respectively, the time windows of time variation 220 for the 4 sequential scheduled policy execution times T1 302, T2 304, T3 306 and T4 308 at each of 4 hours. A compliance check may be performed periodically. In the example 300, element 310 denotes the time X1 at which the compliance check processing is performed to determine a compliance level or status for SG 334 with respect to the policy A 225 associated with SG 334.

Element 330 denotes that LUN A has associated snapshot timestamps at the points in time denoted by P1, P3, P5 and P7 on the timeline 301, and that LUN B has associated snapshot timestamps at the points in time denoted by P2, P4, P6 and P8 on the timeline 301. As can be seen from the example 300, P1 and P2 indicate that the timestamps, respectively, for the snapshots of LUNs A and B are within the time window W1 and thus determined to correspond to the scheduled policy execution time T1. P3 and P4 indicate that the timestamps, respectively, for the snapshots of LUNs A and B are within the time window W2 and thus determined to correspond to the scheduled policy execution time T2. P5 and P6 indicate that the timestamps, respectively, for the snapshots of LUNs A and B are within the time window W3 and thus determined to correspond to the scheduled policy execution time T3. P7 and P8 indicate that the timestamps, respectively, for the snapshots of LUNs A and B are within the time window W4 and thus determined to correspond to the scheduled policy execution time T4.

Thus, there are 4 valid SG snapshots in the 4 hour time period from T1 to T4 and no invalid SG snapshots in the 4 hour time period. Thus there is 100% compliance to the policy A 335 in the example 300.

In this example, assume further that the policy A 335 defines two boundaries of 100% and 90% so that a compliance level or status of green is determined if the compliance percentage is 100%. If the compliance percentage is less than 100% and also greater than 90%, a compliance level or status of yellow is determined. If the compliance percentage is 90% or less, the compliance level or status of red is determined. In this example with a compliance of 100%, a compliance level or status of green is determined.

Figure 6:
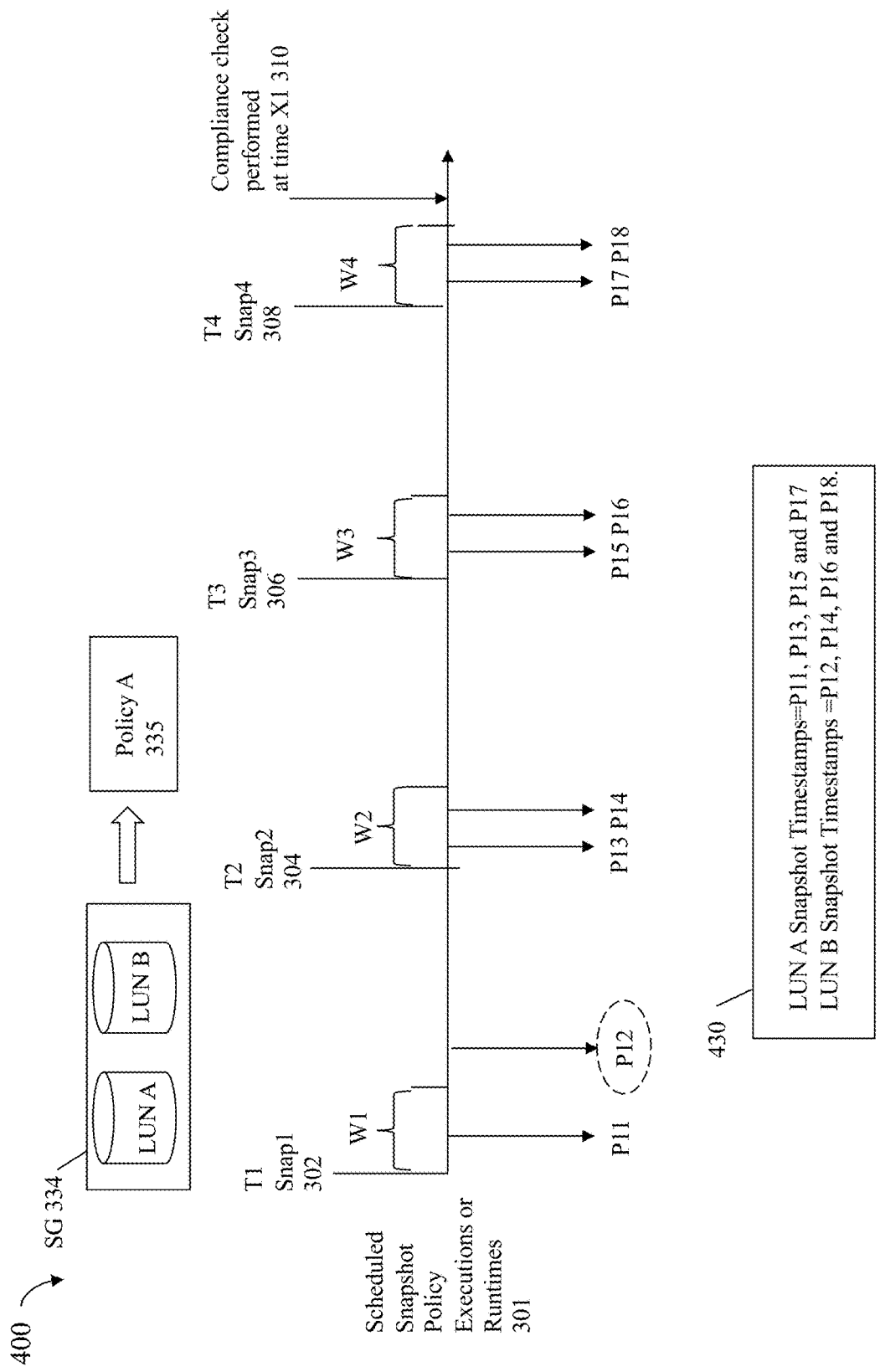

With reference to FIG. 6, shown is another example illustrating use of the techniques herein for determining a compliance level of status. The example 400 includes similarly numbered elements as described in connection with FIG. 5 but with different LUN snapshot timestamps 430.

Element 430 denotes that LUN A has associated snapshot timestamps at the points in time denoted by P11, P13, P15 and P17 on the timeline 301, and that LUN B has associated snapshot timestamps at the points in time denoted by P12, P14, P16 and P18 on the timeline 301. As can be seen from the example 400, P11 indicates the timestamp for LUN A is within the time window W1 for the scheduled policy execution time T1. However, P12 indicates that the timestamp for LUN B is not within the window W1 for the scheduled execution time T1. P12 indicates that the snapshot of LUN B does not correspond to the scheduled policy execution time T1. Thus, the policy executed at the time T1 302 has an invalid SG snapshot because the timestamp P12 for LUN is not within the time window W1.

P13 and P14 indicate that the timestamps, respectively, for the snapshots of LUNs A and B are within the time window W2 and determined to correspond to the scheduled execution time T2. Thus, the policy executed at the time T2 304 has a valid SG snapshot.

P15 and P16 indicate that the timestamps, respectively, for the snapshots of LUNs A and B are within the time window W3 and determined to correspond to the scheduled execution time T3. Thus, the policy executed at the time T3 306 has a valid SG snapshot.

P17 and P18 indicate that the timestamps, respectively, for the snapshots of LUNs A and B are within the time window W4 and determined to correspond to the scheduled execution time T4. Thus, the policy executed at the time T4 308 has a valid SG snapshot.

Overall, there are 3 valid SG snapshots in the 4 hour time period from T1 to T4 and 2 invalid SG snapshot in the 4 hour time period. Thus there is 75% compliance to the policy A 335 in the example 400.

Assume further that the policy A 335 defines the two boundaries of 100% and 90% so that a compliance level or status of green is determined if the compliance percentage is 100%. If the compliance percentage is less than 100% and also greater than 90%, a compliance level or status of yellow is determined. If the compliance percentage is 90% or less, the compliance level or status of red is determined. In this example 400, with a compliance of 75%, a compliance level or status of red is determined.

In at least one embodiment, whether a snapshot of a LUN has a status of good or otherwise bad may be determined based on properties of the snapshot as well as whether the snapshot of the LUN is missing. Consistent with discussion above, the snapshot of a LUN may have a status of good if the snapshot is in existence (not missing) and is also non-failed as indicated by one or more properties of the LUN snapshot. A snapshot of a LUN may be missing for any reason such as, for example, no snapshot of the LUN has been created with respect to a policy runtime such as due to suspension of the policy, the snapshot of the LUN taken during a policy execution was terminated or deleted, and the like.

In at least one embodiment, a missing SG snapshot for a scheduled policy execution time due to policy suspension is determined as an invalid SG. Manual deletion or termination of any LUN snapshot included in an SG snapshot causes the SG snapshot to be determined as invalid.

In at least one embodiment, if the SG and a policy have recently been associated and the maximum number of snapshots to retain 112c has not yet been reached, the percentage of valid SG snapshots may be scaled based on the number of scheduled policy executions that have actually occurred. For example, if the maximum number of snapshots to retain 112c is 10, but only 5 policy executions have occurred, the percentage of valid snapshots, denoting the compliance percentage, may be based on a percentage of how many of the 5 policy executions have valid SG snapshots.

Figure 7A:
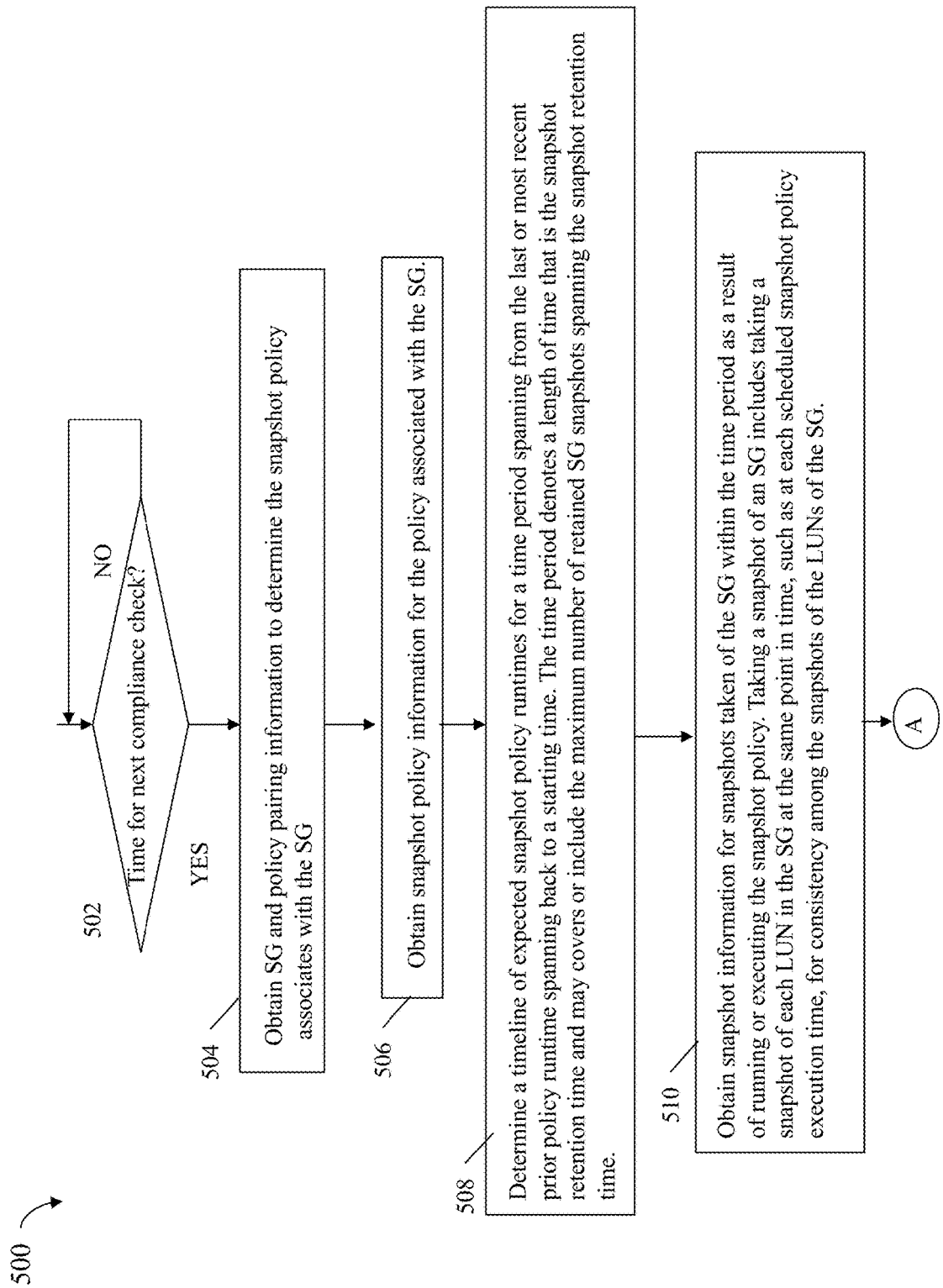
FIGS. 7A and 7B are flowcharts of processing that may be performed in an embodiment in accordance with the techniques herein.
Figure 7B:
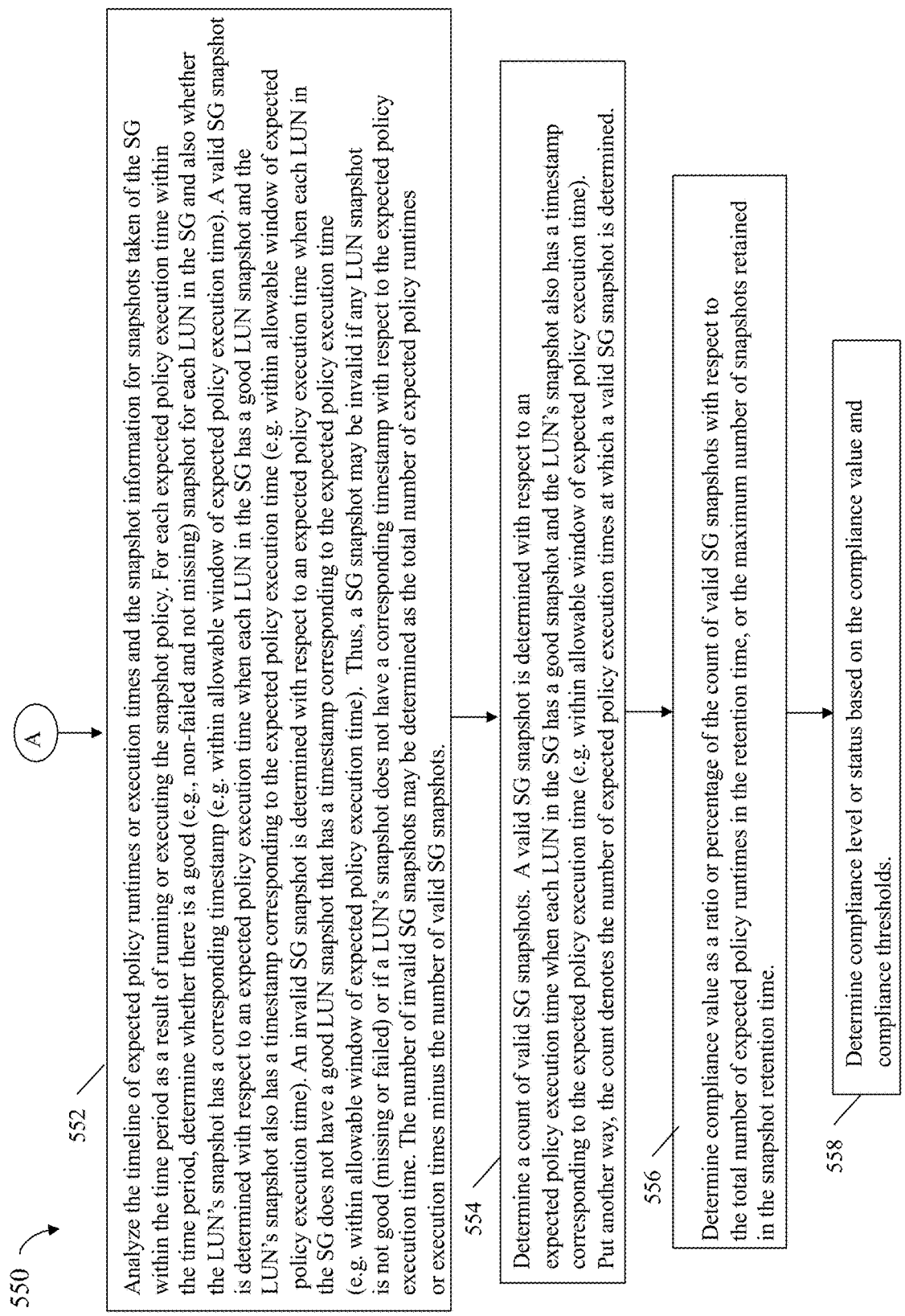

Referring to FIGS. 7A and 7B, shown are flowcharts of processing steps that may be performed in an embodiment in accordance with the techniques herein. The processing of FIGS. 7A and 7B summarize processing as described above for a single SG associated with a single policy.

At the step 502, a determination is made as to whether it is time for the next periodic compliance check to be performed. If the step 502 evaluates to no, control remains at the step 502. If the step 502 evaluates to yes, control proceeds to the step 504. At the step 504, the SG and policy pairing information is obtained to determine the snapshot policy associated with the SG. From the step 504, control proceeds to the step 506 to obtain the snapshot policy information for the policy associated with the SG. The step 506 may include obtaining the policy information 112 of FIG. 3. From the step 506, control proceeds to the step 508.

At the step 508, a timeline of expected snapshot policy runtimes for the policy is determined for a time period spanning from the last or most recent prior policy runtime, spanning back to a starting time. The time period denotes a length of time that is the snapshot retention time and may cover or include the maximum number of retained SG snapshots 112c spanning the snapshot retention time. From the step 508, control proceeds to the step 510.

At the step 510, snapshot information is obtained for snapshots of the SG taken within the time period as a result of running or executing the policy. Taking a snapshot of an SG includes taking a snapshot of each LUN in the SG at the same point in time, such as at each scheduled snapshot policy execution time, for consistency among the snapshots of the LUNs of the SG. From the step 510, control proceeds to the step 552.

At the step 552, processing is performed to analyze the timeline of expected policy runtimes or execution times (from the step 508) and the snapshot information (from the step 510) for snapshots taken of the SG within the time period as a result of running or executing the snapshot policy. For each expected policy execution time within the time period, determine whether there is a good (e.g., non-failed and not missing) snapshot for each LUN in the SG and also whether the LUN's snapshot has a corresponding timestamp (e.g. within allowable window of expected policy execution time). A valid SG snapshot is determined with respect to an expected policy execution time when each LUN in the SG has a good LUN snapshot and the LUN's snapshot also has a timestamp corresponding to the expected policy execution time (e.g. within allowable window of expected policy execution time). An invalid SG snapshot is determined with respect to an expected policy execution time when each LUN in the SG does not have a good LUN snapshot that has a timestamp corresponding to the expected policy execution time (e.g. within the allowable window of expected policy execution time). Thus, a SG snapshot may be invalid if any LUN snapshot is not good (missing or failed) or if a LUN's snapshot does not have a corresponding timestamp with respect to the expected policy execution time. The number of invalid SG snapshots may be determined as the total number of expected policy runtimes or execution times minus the number of valid SG snapshots. From the step 552, control proceeds to the step 554.

At the step 554, a count of the number of valid SG snapshots within the time period analyzed in the step 552 may be determined. As discussed elsewhere herein, a valid SG snapshot is determined with respect to an expected policy execution time when each LUN in the SG has a good snapshot and the LUN's snapshot also has a timestamp corresponding to the expected policy execution time (e.g. within allowable window of expected policy execution time). Put another way, the count denotes the number of expected policy execution times at which a valid SG snapshot is determined. From the step 554, control proceeds to the step 556.

At the step 556, processing is performed that determines a compliance value as a ratio or percentage of the count of valid SG snapshots with respect to the total number of expected policy runtimes in the retention time, or the maximum number of snapshots retained in the snapshot retention time. From the step 556, control proceeds to the step 558. At the step 558, processing determines a compliance level or status for the time period based on the compliance value (from the step 556) and the compliance thresholds of the policy.

Figure 8:
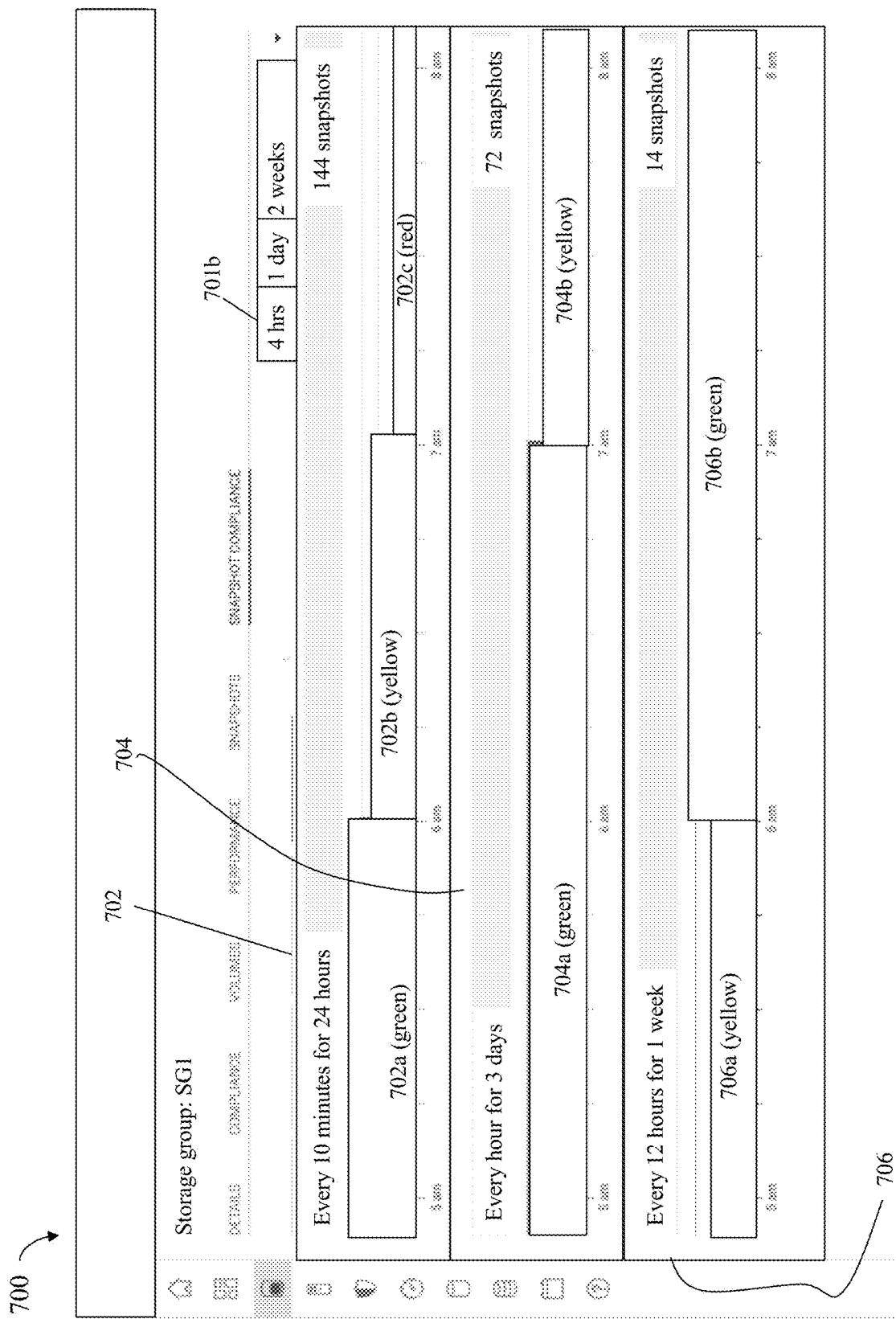
FIGS. 8, 9 and 10 illustrate information that may be displayed in a user interface in an embodiment in accordance with the techniques herein.

Referring to FIG. 8, shown is an example of screenshot that may be displayed in a GUI in an embodiment in accordance with the techniques herein. The example 700 displays a compliance status or level for storage group SG1 for 3 different policies associated with SG1. In connection with the GUI, the screenshot in the example 700 may be displayed as a result of selecting tab 701b to display information regarding snapshot compliance for SG for 4 hours. The 3 different policies associated with SG1 may include boundary 2 boundary values denoting 3 percentage ranges such as discussed elsewhere herein.

Element 702 denotes a first portion of the GUI in which information is displayed for a first policy associated with SG1 in which a snapshot is taken of the SG every 10 minutes and the first policy has a snapshot retention time of 24 hours. Thus, the maximum number of snapshots retained for the first policy for SG1 is 144 snapshots of SG1. The element 702 includes a colored bar graph of the number of valid SG snapshots on the Y axis and time on the X axis. Element 702a indicates a time period during which a compliance status or level of green is determined for the first policy for SG1. Element 702b indicates a time period during which a compliance status or level of yellow is determined for the first policy for SG1. Element 702c indicates a time period during which a compliance status or level of red is determined for the first policy for SG1. In the GUI, area denoted by 702a may be displayed with a visual indicator such as the color green to denote a green or highest level of compliance to the first policy. Area denoted by 702b may be displayed with a visual indicator such as the color yellow to denote a yellow or middle level of compliance to the first policy. Area denoted by 702c may be displayed with a visual indicator such as the color red to denote a red or lowest level of compliance to the first policy. In at least one embodiment, any color or compliance status other than green may be characterized as non-compliant with respect to the policy. Thus, SG1 may be characterized as non-compliant, or not fully compliant with respect to the first policy during the time periods associated with 702b and 702c. SG1 may be characterized as compliant or fully compliant with respect to the first policy during the time period 702a.

Element 704 denotes a second portion of the GUI in which information is displayed for a second policy associated with SG1 in which a snapshot is taken of the SG every hour and the second policy has a snapshot retention time of 3 days. Thus, the maximum number of snapshots retained for the first policy for SG1 is 72 snapshots of SG1. The element 704 includes a colored bar graph of the number of valid SG snapshots on the Y axis and time on the X axis. Element 704a indicates a time period during which a compliance status or level of green is determined for the first policy for SG1. Element 704b indicates a time period during which a compliance status or level of yellow is determined for the first policy for SG1. In the GUI, area denoted by 704a may be displayed with a visual indicator such as the color green to denote a green or highest level of compliance to the second policy. Area denoted by 704b may be displayed with a visual indicator such as the color yellow to denote a yellow or middle level of compliance to the second policy. SG1 may be characterized as non-compliant, or not fully compliant with respect to the first policy during the time period associated with 704b and compliant or fully compliant during the time period associated with 704a.

Element 706 denotes a third portion of the GUI in which information is displayed for a third policy associated with SG1 in which a snapshot is taken of the SG every 12 hours and the third policy has a snapshot retention time of 1 week. Thus, the maximum number of snapshots retained for the third policy for SG1 is 14 snapshots of SG1. The element 706 includes a colored bar graph of the number of valid SG snapshots on the Y axis and time on the X axis. Element 706a indicates a time period during which a compliance status or level of yellow is determined for the third policy for SG1. Element 706b indicates a time period during which a compliance status or level of green is determined for the third policy for SG1. In the GUI, area denoted by 702a may be displayed with a visual indicator such as the color yellow to denote a yellow or middle level of compliance to the third policy. Area denoted by 702b may be displayed with a visual indicator such as the color green to denote the highest level of compliance to the third policy. In at least one embodiment, any color or compliance status other than green may be characterized as non-compliant with respect to the policy. Thus, SG1 may be characterized as non-compliant, or not fully compliant with respect to the first policy during time period associated with 706a, and may be characterized as compliant or fully compliant during the time period associated with 706b.

Figure 9:
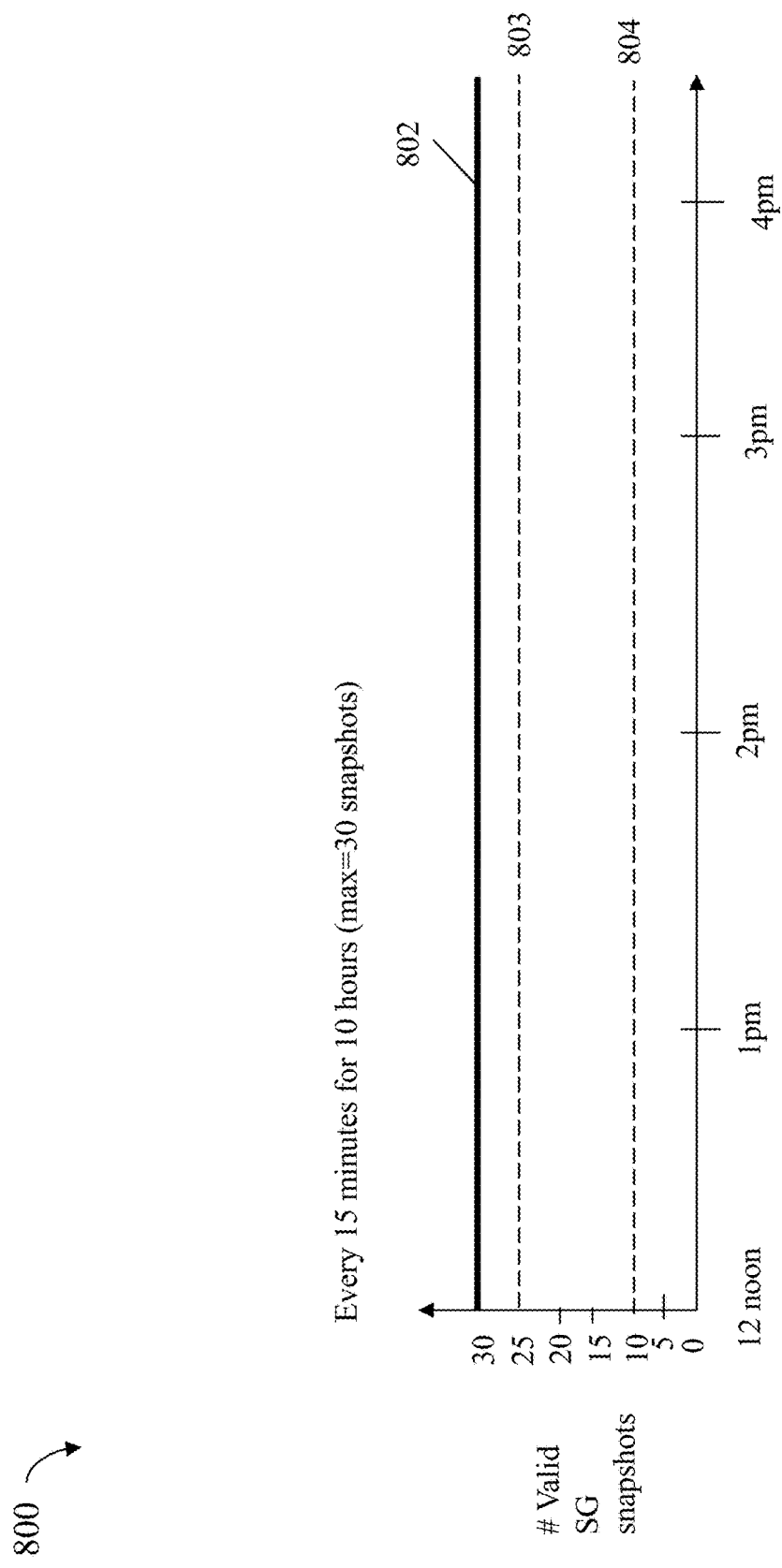

Referring to the FIG. 9, shown is another way in which snapshot compliance information for an SG may be visually displayed in a GUI in an embodiment in accordance with the techniques herein. The example 800 may be used as another way to display snapshot compliance information for an SG with respect to a single associated policy. The example 800 may be used as another way to display the information in each of the different portions 702, 704 and 706 of FIG. 8. The example 800 includes a Y axis denoting the number of valid SG snapshots on the Y axis and time on the X axis.

The example 800 displays compliance information for an SG for a policy that takes a snapshot of the SG every 15 minutes with a snapshot retention time of 10 hours. Thus a maximum of 30 snapshots are retained for the policy. The line 803 may denote a first threshold boundary and the line 804 may denote a second threshold boundary. The first and second threshold boundaries denoted, respectively, by the lines 803 and 804 may be included in the policy information (e.g., compliance thresholds 114a). The line 802 may denote the number of valid SG snapshots at different points in time for the SG with respect to the policy. In this example, the 802 indicates that there are 30 valid snapshots of the SG at each of the points in time included in the display from 12 noon to about 4:30 pm. At any point in time, if the number of valid SG snapshots indicated by the line 802 is above the threshold boundary line 803, the compliance level or status is green denoting the highest level of compliance. If the number of valid SG snapshots indicated at a point in time by the line 802 is at or below the threshold boundary line 803 and above the line 804, the compliance level or status is yellow denoting the middle level of compliance. If the number of valid SG snapshots indicated at a point in time by the line 802 is at or below the line 804, the compliance level or status is red denoting the lowest level of compliance.

Figure 10:
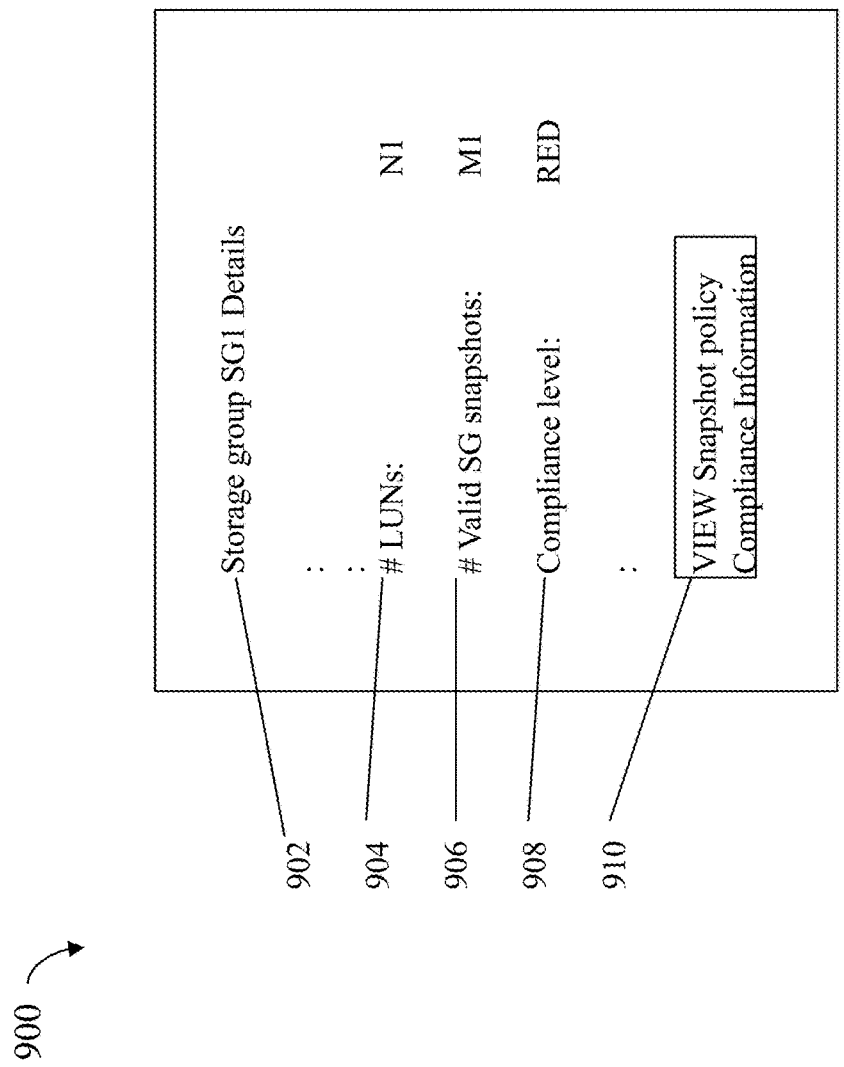

Referring to the FIG. 10, shown is an example of another screenshot of information that may be displayed in a GUI in an embodiment in accordance with the techniques herein. The example 900 includes a display of information that may be displayed in connection with storage group SG1. Element 902 indicates the storage group name SG1. Element 904 indicates the number of LUNs in SG1. Element 906 indicates the current number of valid SG snapshots for SG1. Element 908 indicates a current compliance level or status for SG1. In an embodiment having multiple policies associated with a single SG, such as SG1, the compliance level 908 may denote a current aggregated compliance level or status for the SG1 determined in accordance with the current compliance level or status of each policy associated with SG1. In at least one embodiment, the current aggregated compliance level or status 908 for SG1 may be the lowest or worst level of compliance of all policies associated with SG1. For example, if there are 3 policies associated with SG1 and one of the policies currently has a red compliance level or status and the remaining 2 policies each have a current compliance level or status of green, element 908 may denote the red compliance level or status. Element 910 may denote a button or UI element that, if selected, results in displaying historical and current snapshot compliance information for SG1. For example, if there are 3 policies associated with SG1, the button 910 may be selected to view additional details regarding the snapshot compliance information for SG1 for the 3 policies. The additional details displayed responsive to selecting the button 910 may include 3 display portions or panels similar to 702, 704 and 706 of FIG. 8 (e.g., one portion or panel for a graphical display of compliance information for each of the 3 policies associated with SG1).

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method of determining snapshot compliance comprising:

receiving, using a processor, policy information for a snapshot policy associated with a storage group, wherein the storage group includes one or more logical devices, wherein the policy information includes a snapshot creation interval, a retention time denoting an amount of time to keep snapshots for the storage group, a maximum number of snapshots retained, and at least one compliance threshold;

receiving, using a processor, snapshot information regarding snapshots taken of the storage group during a time period denoting an amount of time corresponding to the retention time for the storage group;

determining, using a processor and based on the snapshot creation interval, a timeline of a plurality of expected policy runtimes denoting different points in time at which the snapshot policy is scheduled to run to take a snapshot of the storage group;

analyzing, using a processor, the snapshot information and the timeline to determine a number of valid snapshots of the storage group; and determining, using a processor, a compliance level for the time period based on the number of valid snapshots of the storage group and the at least one compliance threshold.

2. The computer implemented method of claim 1, wherein the at least one compliance threshold includes a plurality of compliance thresholds.

3. The computer implemented method of claim 2, wherein the plurality of compliance thresholds denotes a plurality of ranges of values, each of the plurality of ranges denoting a different one of a plurality of compliance levels, and wherein determining the compliance level includes:
  determining a percentage of the number of valid snapshots of the storage group with respect to the maximum number of snapshots retained;
  determining that a first of the plurality of ranges includes the percentage, wherein the first range denotes a first of the plurality of compliance levels; and
  determining the compliance level as the first compliance level denoted by the first range.

4. The computer implemented method of claim 1, further comprising:
  executing the snapshot policy at the plurality of expected policy runtimes to take a snapshot of the storage group, wherein said executing at each of the plurality of expected policy runtimes includes taking a snapshot of each logical device of the storage group.

5. The computer implemented method of claim 1, wherein the number of valid snapshots of the storage group denotes a number of the plurality of expected policy runtimes at which a valid snapshot of the storage group is taken.

6. The computer implemented method of claim 5, further comprising:
  determining, for each of the plurality of expected policy runtimes, whether each logical device of the storage group has a good snapshot with an associated timestamp corresponding to said each expected policy runtime; and
  responsive to determining, for said each expected policy runtime, that each logical device of the storage group has a good snapshot with an associated timestamp corresponding to said each expected policy runtime, determining that said each expected policy runtime has a valid snapshot of the storage group, and otherwise, determining that said each expected policy runtime does not have a valid snapshot of the storage group.

7. The computer implemented method of claim 6, wherein a first of the plurality of expected policy runtimes is associated with a time window of allowable time variation and wherein the first expected policy runtime is determined to have a valid snapshot of the storage group, wherein each logical device of the storage group has a good snapshot taken with an associated timestamp included in a first time range, wherein the first time range spans from a starting value of the first expected policy runtime to an ending value denoted by the sum of the first expected policy runtime and an amount of time denoted by the time window.

8. The computer implemented method of claim 7, wherein the time window is determined as a minimum of two values, wherein the two values include a maximum amount of time, and a second amount of time that is a percentage of the snapshot creation interval.

9. The computer implemented method of claim 7, wherein the storage group is one of a plurality of storage groups and the snapshot policy is one of a plurality of snapshot policies, and wherein each of the plurality of snapshot policies is scheduled to run for at least one of the plurality of storage groups at a first point in time denoted by the first expected policy runtime.

10. The computer implemented method of claim 9, wherein a number of snapshots of logical devices scheduled to run at the first point in time exceeds a threshold number and the method includes:
  determining the time window in accordance with the number of snapshots of logical devices scheduled to run at the first point in time.

11. The computer implemented method of claim 7, wherein the storage group is one of a plurality of storage groups and the snapshot policy is one of a plurality of snapshot policies, and wherein each of the plurality of snapshot policies is scheduled to run for at least one of the plurality of storage groups within a first time period beginning with the first expected policy runtime.

12. The computer implemented method of claim 11, wherein a number of snapshots of logical devices scheduled to run during the first time period exceeds a threshold number and the method includes:
  determining the time window in accordance with the number of snapshots of logical devices scheduled to run at during the first time period.

13. A system comprising:
  one or more processors; and
  a memory comprising code stored thereon that, when executed by at least a first of the one or more processors, performs a method of determining snapshot compliance comprising:
    receiving policy information for a snapshot policy associated with a storage group, wherein the storage group includes one or more logical devices, wherein the policy information includes a snapshot creation interval, a retention time denoting an amount of time to keep snapshots for the storage group, a maximum number of snapshots retained, and at least one compliance threshold;
    receiving snapshot information regarding snapshots taken of the storage group during a time period denoting an amount of time corresponding to the retention time for the storage group;
    determining, based on the snapshot creation interval, a timeline of a plurality of expected policy runtimes denoting different points in time at which the snapshot policy is scheduled to run to take a snapshot of the storage group;
    analyzing the snapshot information and the timeline to determine a number of valid snapshots of the storage group; and
    determining a compliance level for the time period based on the number of valid snapshots of the storage group and the at least one compliance threshold.

14. A non-transitory computer readable medium comprising code stored thereon that, when executed, performs a method of determining snapshot compliance comprising:
  receiving policy information for a snapshot policy associated with a storage group, wherein the storage group includes one or more logical devices, wherein the policy information includes a snapshot creation interval, a retention time denoting an amount of time to keep snapshots for the storage group, a maximum number of snapshots retained, and at least one compliance threshold;
  receiving snapshot information regarding snapshots taken of the storage group during a time period denoting an amount of time corresponding to the retention time for the storage group;

determining, based on the snapshot creation interval, a timeline of a plurality of expected policy runtimes denoting different points in time at which the snapshot policy is scheduled to run to take a snapshot of the storage group;

analyzing the snapshot information and the timeline to determine a number of valid snapshots of the storage group; and determining a compliance level for the time period based on the number of valid snapshots of the storage group and the at least one compliance threshold.

15. The non-transitory computer readable medium of claim 14, wherein the at least one compliance threshold includes a plurality of compliance thresholds.

16. The non-transitory computer readable medium of claim 15, wherein the plurality of compliance thresholds denotes a plurality of ranges of values, each of the plurality of ranges denoting a different one of a plurality of compliance levels, and wherein determining the compliance level includes:

determining a percentage of the number of valid snapshots of the storage group with respect to the maximum number of snapshots retained; and determining that a first of the plurality of ranges includes the percentage, wherein the first range denotes a first of the plurality of compliance levels;

determining the compliance level as the first compliance level denoted by the first range.

17. The non-transitory computer readable medium of claim 14, wherein the method further comprises:

executing the snapshot policy at the plurality of expected policy runtimes to take a snapshot of the storage group, wherein said executing at each of the plurality of expected policy runtimes includes taking a snapshot of each logical device of the storage group.

18. The non-transitory computer readable medium of claim 14, wherein the number of valid snapshots of the storage group denotes a number of the plurality of expected policy runtimes at which a valid snapshot of the storage group is taken.

19. The non-transitory computer readable medium of claim 18, wherein the method further comprises:

determining, for each of the plurality of expected policy runtimes, whether each logical device of the storage group has a good snapshot with an associated timestamp corresponding to said each expected policy runtime; and responsive to determining, for said each expected policy runtime, that each logical device of the storage group has a good snapshot with an associated timestamp corresponding to said each expected policy runtime, determining that said each expected policy runtime has a valid snapshot of the storage group, and otherwise, determining that said each expected policy runtime does not have a valid snapshot of the storage group.

20. The non-transitory computer readable medium of claim 19, wherein a first of the plurality of expected policy runtimes is associated with a time window of allowable time variation and wherein the first expected policy runtime is determined to have a valid snapshot of the storage group, wherein each logical device of the storage group has a good snapshot taken with an associated timestamp included in a first time range, wherein the first time range spans from a starting value of the first expected policy runtime to an ending value denoted by the sum of the first expected policy runtime and an amount of time denoted by the time window.

* * * * *